United States Patent
Yoshimitsu

(10) Patent No.: US 8,083,920 B2
(45) Date of Patent: Dec. 27, 2011

(54) METHOD FOR MANUFACTURING SOLID ELECTROLYTIC CAPACITOR

(75) Inventor: Satoru Yoshimitsu, Saga (JP)

(73) Assignees: Sanyo Electric Co., Ltd, Moriguchi-shi (JP); Saga Sanyo Industries Co., Ltd, Kishima-gun (JP)

( * ) Notice: Subject to any disclaimer, the term of this patent is extended or adjusted under 35 U.S.C. 154(b) by 334 days.

(21) Appl. No.: 12/411,424

(22) Filed: Mar. 26, 2009

(65) Prior Publication Data

US 2009/0242415 A1     Oct. 1, 2009

(30) Foreign Application Priority Data

Mar. 31, 2008  (JP) ................... 2008-093469

(51) Int. Cl.
*C23C 28/00* (2006.01)
*C25D 5/00* (2006.01)
(52) U.S. Cl. ............. 205/198; 205/171; 205/188
(58) Field of Classification Search ........... 205/171, 205/188, 198; 361/524, 531; 252/62.2
See application file for complete search history.

(56) References Cited

U.S. PATENT DOCUMENTS 7,289,313 B2 * 10/2007 Takeda et al. ............ 361/523

FOREIGN PATENT DOCUMENTS

| JP | 05159980 A | * | 6/1993 |
| JP | 2002-289479 | | 10/2002 |
| WO | WO 2004075220 A1 | * | 9/2004 |

OTHER PUBLICATIONS

Sekiguchi et al., "Electropolymerization of Pyrrole in 1-ethyl-3-methylimidazolium Trifluoromethanesulfonate Room Temperature Ionic Liquid," Electrochemistry Communications (no month, 2002), vol. 4, pp. 881-885.*

* cited by examiner

*Primary Examiner* — Edna Wong
(74) *Attorney, Agent, or Firm* — Turocy & Watson, LLP

(57) ABSTRACT

A method for manufacturing a solid electrolytic capacitor having a capacitor element produced by the steps of: forming a dielectric coating layer on the surface of an anode body, forming a conductive polymer cathode layer on the dielectric coating layer, and forming a cathode lead-out layer on the conductive polymer cathode layer, wherein the step of forming the conductive polymer cathode layer includes an electrolytic polymerization step of forming the conductive polymer cathode layer on the surface of the anode body on which the dielectric coating layer is formed by electrolytic polymerization using an electrolytic polymerization solution containing at least a monomer to be polymerized into the conductive polymer and an ionic liquid.

2 Claims, 1 Drawing Sheet

METHOD FOR MANUFACTURING SOLID ELECTROLYTIC CAPACITOR

BACKGROUND OF THE INVENTION

1. Field of the Invention

The present invention relates to a method for manufacturing a solid electrolytic capacitor, particularly a method for manufacturing a solid electrolytic capacitor with an increased capacitance and a decreased ESR (equivalent series resistance).

2. Description of the Related Art

In recent years, along with digitalization and increase of frequency of electronic appliances, solid electrolytic capacitors are also required to having higher capacities than those of conventional ones and be excellent in impedance property in a high frequency region. This solid electrolytic capacitor 100, as shown in FIG. 1 and FIG. 2, is completed by following steps. Specifically, first, a capacitor element 10 is produced by the steps: forming a dielectric coating layer 2 by oxidizing the surface of an anode body 1 having a structure in which an anode lead 5 is implanted in a sintered body made of a valve metal (tantalum, niobium, titanium, aluminum, and the like), forming a solid electrolytic layer 3 (a first solid electrolytic layer 3a and a second solid electrolytic layer 3b) made of a conductive inorganic material such as manganese dioxide or a conductive organic material such as TCNQ complex salt, conductive polymer, or the like on the dielectric coating layer 2, and forming a cathode lead-out layer 4 composed of a carbon layer 4a and a silver paste layer 4b on the solid electrolytic layer. Next, the steps of connecting an anode terminal 7 to the anode lead 5 and connecting a cathode terminal 6 to the cathode lead-out layer 4 through a conductive adhesive 8 are performed and whereby, the capacitor element 10 is connected to the respective terminals 6 and 7. Furthermore a step of coating the capacitor element 10 with an external resin 9 such as an epoxy resin or the like is performed and whereby, the solid electrolytic capacitor is produced.

Herein, in the step of forming the solid electrolytic layer 3 composed of a conductive polymer, for example, proposed is a method for forming a relatively thick conductive polymer cathode layer by an electrolytic polymerization method using a water-based electrolytic polymerization solution on a thin conductive polymer cathode layer formed by a chemical polymerization method. (see, for example, Japanese Unexamined Patent Publication No.2002-289479)

More particularly, with respect to a solid electrolytic capacitor according to the above-mentioned conventional method, for example, a tantalum porous sintered body is used as an anode body and a dielectric coating layer of tantalum oxide is formed on the surface of the anode body. Further, a solid electrolytic layer is formed on the dielectric coating layer by successively forming a conductive polymer cathode layer by chemical polymerization and a conductive polymer cathode layer by electrolytic polymerization. The electrolytic polymerization conductive polymer cathode layer above is formed on the chemical polymerization conductive polymer cathode layer by immersing the anode body having the conductive polymer cathode layer formed by chemical polymerization in an electrolytic polymerization aqueous solution containing a monomer and an alkyl aromatic sulfonic acid salt bringing a metal wire for electric communication into contact with the conductive polymer cathode layer formed by the chemical polymerization, and carrying out electrolytic polymerization by applying electric current to the electrolytic polymerization solution.

However, according to investigations of the present inventors, a solidification capacity ratio, i.e., a ratio of the electrostatic capacitance by measured the anode body without immersion in an aqueous sulfuric acid solution with respect to the electrostatic capacitance (electrostatic capacitance in-water) by measured the anode body immersed in the aqueous sulfuric acid solution, is less than about 80%.

The reason why the low ratio is that, since the anode body of the porous sintered body such as tantalum has nanoporous structure, it is difficult to densely form the above-mentioned solid electrolytic layer in the insides of fine pores of the porous sintered body. Therefore, there is a problem that no sufficient electrostatic capacitance can be obtained.

Further, if constant current is continuously applied, the conductive polymer cathode layer formed by electrolytic polymerization is acceleratedly increased around the feeding point where the above-mentioned metal wire is brought into contact with the above-mentioned conductive polymer cathode layer formed by chemical polymerization. Consequently the distribution of the layer of the conductive polymer forming the solid electrolytic layer becomes uneven.

Further, since ESR (equivalent series resistance) of a solid electrolytic capacitor having such an uneven solid electrolytic layer tends to be increased, it is required to produce a solid electrolytic capacitor having lower ESR.

SUMMARY OF THE INVENTION

The object of present invention is to provide a method for manufacturing a solid electrolytic capacitor with an increased capacitor capacitance and a decreased ESR.

According to the invention, there is provided a method for manufacturing a solid electrolytic capacitor having a capacitor element produced by the steps of: forming a dielectric coating layer on the surface of an anode body, forming a conductive polymer cathode layer on the dielectric coating layer, and forming a cathode lead-out layer on the conductive polymer cathode layer, wherein the step of forming the conductive polymer cathode layer comprises an electrolytic polymerization step of forming the conductive polymer cathode layer on the surface of the anode body on which the dielectric coating layer is formed by electrolytic polymerization using an electrolytic polymerization solution containing at least a monomer to be polymerized into the conductive polymer and an ionic liquid.

Other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE PREFERRED EMBODIMENTS

Hereinafter, preferable embodiments of the present invention will be described with reference to drawings.

Figure 1:
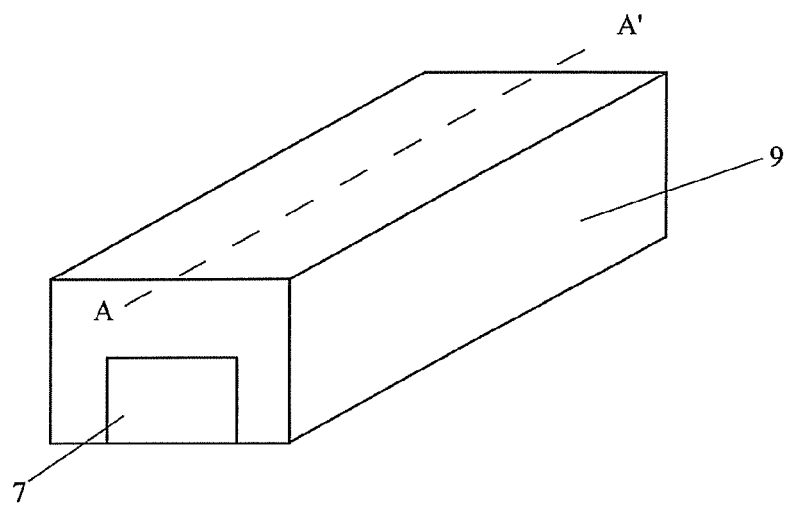
FIG. 1 is a perspective view of a solid electrolytic capacitor of one example of the invention.
Figure 2:
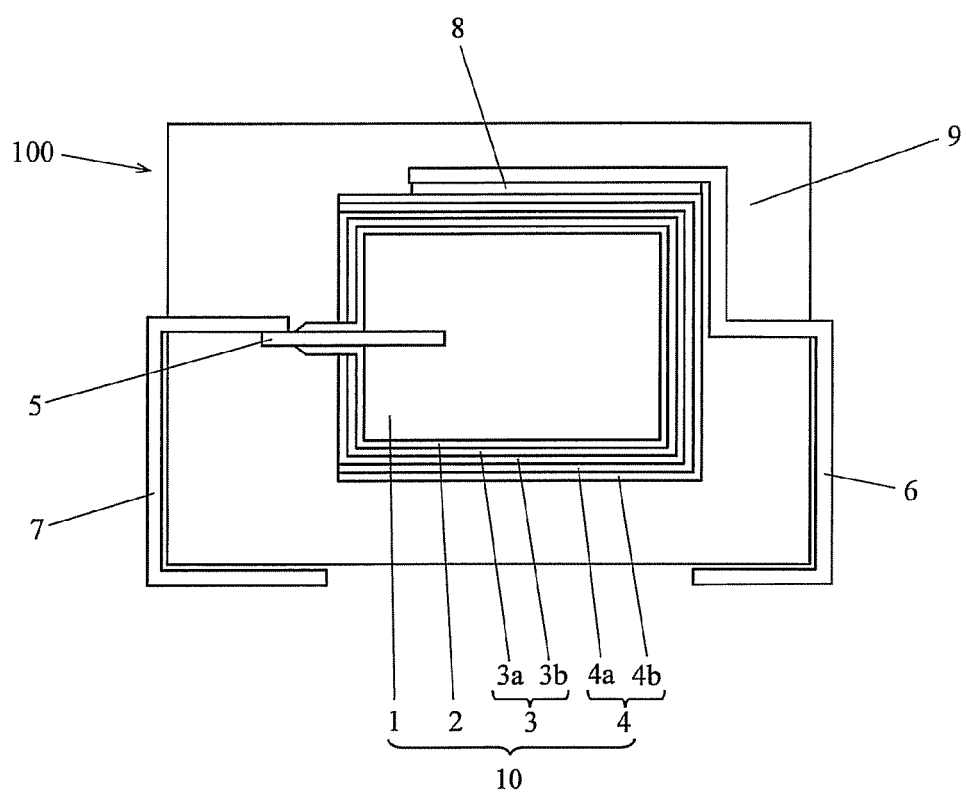
FIG. 2 is a cross-sectional schematic view cutting the solid electrolytic capacitor along the A-A' line in FIG. 1

A method for manufacturing a solid electrolytic capacitor according to an embodiment, as shown in FIG. 1 and FIG. 2, carrying out a conversion treatment of an anode body 1 formed by projecting an anode lead 5 to a sintered body of tantalum in a conversion solution such as an aqueous phosphoric acid solution or the like to form a dielectric coating layer 2 of tantalum oxide on the surface of the anode body 1. The above-mentioned conversion solution to be used may be an aqueous nitric acid solution, an aqueous sulfuric acid solution, an aqueous ammonium adipate solution, and the like.

Thereafter, in a chemical polymerization step, a conductive polymer cathode layer as a first solid electrolytic layer 3a is formed by chemical polymerization of monomers to be polymerized into a conductive polymer, such as thiophene, pyrrole, aniline, polyacetylene, or derivatives thereof, on the surface of the dielectric coating layer 2 of the anode body 1. Further, in an electrolytic polymerization step, an electrolytic polymerization solution is prepared by adding monomers to be polymerized into a conductive polymer, such as thiophene, pyrrole, aniline, polyacetylene, or derivatives thereof in an ionic liquid, and the anode body 1 on which the first solid electrolytic layer 3a is formed is immersed in the electrolytic polymerization solution to form a conductive polymer cathode layer of a second solid electrolytic layer 3b by electrolytic polymerization. That is, the conductive polymer cathode layer formed by the chemical polymerization becomes the first solid electrolytic layer 3a and the conductive polymer cathode layer formed by the electrolytic polymerization becomes the second solid electrolytic layer 3b.Further, a step of successively forming a cathode lead-out layer 4 composed of a carbon layer 4a and a silver paste layer 4b on the second solid electrolytic layer 3b is carried out to form the capacitor element 10.

In the above-mentioned electrolytic polymerization step, intermittent constant current is preferable to be employed at the time of the electrolytic polymerization. Preferably, as parameters of the intermittent constant current at the time of the above-mentioned electrolytic polymerization, current value I=0.01-1 mA, electricity application width W=1-600 seconds, buffer time T=10-600 seconds (time applying no current), and the repeat number N=1-200 times were employed.

Herein, the above-mentioned ionic liquid is a molten salt at normal temperature. Specifically, the ionic liquid is a salt in liquid phase containing no solvent around normal temperature, and thus has specific characteristics compared with conventional solvents. For example, the ionic liquid has the characteristics such as high ion conductivity, high electrochemical stability, thermal stability, non-flammability. Furthermore, the ionic liquid has high ion density, low vapor pressure, and high polarity. Examples of the ionic liquid include imidazolium-based ionic liquids and piperidinium-basedionic liquids.

For example, the imidazolium-based ionic liquids can use the ion liquid that a cation part is 1,3-dimethylimidazolium, 1-methyl-3-propylimidazolium, 1-butyl-3-methylimidazolium, 1-methyl-3-pentylimidazolium, 1-hexyl-3-methylimidazolium, 1-heptyl-3-methylimidazolium, 1-methyl-3-octylimidazolium, 1-decyl-3-methylimidazolium, 1-dodecyl-3-methylimidazolium, 1-ethyl-3-propylimidazolium, 1-butyl-3-ethylimidazolium, 1-methoxyethyl-3-methylimidazolium, or 1-cyanoethyl-3-methylimidazolium.

For example, the piperidinium-based ionic liquids can use the ion liquid that a cation part is N,N-dimethylpiperidinium, N,N-diethylpiperidinium, N-methyl-N-ethylpiperidinium, N-methyl-N-propylpiperidinium, N-methyl-N-butylpiperidinium, or N-methyl-N-hexylpiperidinium.

For example, as the ionic liquid having the above-mentioned characteristics, 1-ethyl-3-methylimidazolium tetrafluoroborate (EMI-BF4, following chemical formula (1)), 1-methyl-3-allylimidazolium tetrafluoroborate (MAI-BF4, following chemical formula (2)), or N-methyl-N-propylpiperidinium bis(tetrafluoroborate)imide (MPPI-BF4, following chemical formula (3)), having a wide potential window, can be preferably used. These ionic liquids can be used singly or in combination of 2 or more kinds. By carrying out electrolytic polymerization using the above-mentioned ionic liquid, it is made possible to form a dense conductive polymer cathode layer 3b even in the inside of the fine pores of the anode body 1. That is, the ionic liquid is using as a dopant agent.

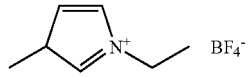

(1)

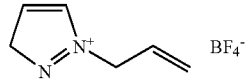

(2)

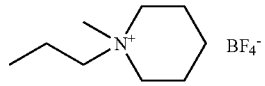

(3)

Next, respective electrode terminals 6 and 7 are connected to the above-mentioned capacitor element 10 by connecting the anode terminal 7 to the anode lead 5 lead out from one end of the anode body 1 and connecting the cathode terminal 6 to the cathode lead-out layer 4 with a conductive adhesive 8. Then, the capacitor element 10 was covered with the external resin by a step of exposing portions of the anode terminal 7 and the cathode terminal 6 and coating the capacitor element 10 with an external resin 9 of an epoxy resin or the like.

As described above, the solid electrolytic capacitor shown in FIG. 1 and FIG. 2 is completed.

In addition, the metal having the valve action to be the anode body 1 is not limited to tantalum and may be aluminum, titanium, niobium, and the like. Further, the anode body 1 may be a sintered body type, a single plate type of a foil, and a laminate type of foils.

Further, in the electrolytic polymerization step of forming the second solid electrolytic layer 3b, the second conductive polymer cathode layer may be formed by preparing an electrolytic polymerization solution only containing monomers to be polymerized into a conductive polymer and a dopant agent and carrying out electrolytic polymerization at intermittent constant current.

Hereinafter, Examples and Comparative Examples will be more specifically described. The present invention, however, is not limited to them.

EXAMPLES

Example 1

Hereinafter, Example 1 will be described.

In a step of forming a dielectric coating layer 2, a porous anode body 1, which was obtained by sintering 100 mg of tantalum powder having CV product (a product of a capacity and a voltage) of 46000 μFV/g with an embedded tantalum wire to be an anode lead 5, was subjected to conversion treatment in aqueous solution containing 0.05% by mass of phosphoric acid at a voltage of 40 V to form the dielectric coating layer 2 on the surface of the anode body 1. The electrostatic capacitance in water (measured in an aqueous 8

N sulfuric acid solution) of the anode 1 subjected to the conversion treatment was 133 μF.

Next, in a chemical polymerization step, the anode body 1 subjected to the conversion treatment was immersed in an aqueous oxidizing agent solution prepared by dissolving 5% by mass of hydrogen peroxide and 1% by mass of sulfuric acid and taken out from the aqueous oxidizing agent solution and thereafter, exposed to pyrrole vapor for 60 minutes to form a layer of a conductive polymer made of polypyrrole, by the chemical polymerization. To the anode body 1 on which the polypyrrole layer was formed by chemical polymerization, the polypyrrole layer formation operation by the chemical polymerization was again carried out to form the first solid electrolytic layer 3a.

Next, in an electrolytic polymerization step, the anode 1 on which the first solid electrolytic layer 3a was formed was immersed in an electrolytic polymerization solution containing 0.2 mol/L of pyrrole as a monomer for polymerization and 1-ethyl-3-methylimidazolium tetrafluoroborate (EMI-BF4) as an ionic liquid. A metal wire for electric communication was brought into contact with the first solid electrolytic layer 3a from the outside, and electrolytic polymerization was carried out by applying intermittent constant current to the electrolytic polymerization solution to form a polypyrrole layer as the second solid electrolytic layer 3b of a conductive polymer cathode layer by electrolytic polymerization on a polypyrrole layer of the first solid electrolytic layer 3a.

In this step, as parameters of the intermittent constant current at the time of the above-mentioned electrolytic polymerization, current value I=0.1 mA, electricity application width W=420 seconds, buffer time T=270 seconds (time applying no current), and the repeat number N=150 were employed.

Next, a cathode lead-out layer 4 composed of a conductive carbon layer 4a and a silver paste layer 4b was formed on the anode body 1 on which the second solid electrolytic layer 3b was formed.

Then, the anode lead 5 and an anode terminal 7 were welded by resistance and the cathode lead-out layer 4 of the capacitor element 10 and a cathode terminal 6 were connected with a conductive adhesive 8.

Successively, the capacitor element 10 with which the respective electrode terminals 6 and 7 were connected was covered with an external resin 9 made of an epoxy resin. Thereafter, the anode terminal 7 and the cathode terminal 6 were bent along the external resin 9. Further, an aging treatment was carried out to complete a solid electrolytic capacitor.

Example 2

A capacitor element 10 was produced in the same manner as that of Example 1, except that an electrolytic polymerization solution containing 0.2 mol/L of pyrrole as a polymerizable monomer and 1-methyl-3-allylimidazolium tetrafluoroborate (MAI-BF4) as an ionic liquid was used, in the electrolytic polymerization step of forming the second solid electrolytic layer 3b of Example 1. A solid electrolytic capacitor was produced in the same manner as that of Example 1, except for using the above-obtained electrolytic capacitor element.

Example 3

A capacitor element 10 was produced in the same manner as that of Example 1, except that an electrolytic polymerization solution containing 0.2 mol/L of pyrrole as a polymerizable monomer and N-methyl-N-propylpiperidinium bis (tetrafluoroborate) imide (MPPI-BF4) as an ionic liquid was used, in the electrolytic polymerization step of forming the second solid electrolytic layer 3b of Example 1. A solid electrolytic capacitor was produced in the same manner as that of Example 1, except for using the above-obtained electrolytic capacitor element.

Example 4

A capacitor element 10 was produced in the same manner as that of Example 1, except that a second solid electrolytic layer 3b of polypyrrole was formed by bringing a metal wire for electric communication into contact with the first solid electrolytic layer 3a from the outside and applying continuous constant current adjusted to be 2 mA current density per one capacitor element for 2 hours to the electrolytic polymerization solution, in the electrolytic polymerization step of forming the second solid electrolytic layer 3b of Example 1. A solid electrolytic capacitor was produced in the same manner as that of Example 1, except for using the above-obtained electrolytic capacitor element.

Example 5

A capacitor element 10 was produced in the same manner as that of Example 1, except that an electrolytic polymerization solution containing 0.2 mol/L of pyrrole as a polymerizable monomer and 0.06 mol/L of an alkyl aromatic sulfonic acid salt as a dopant agent as well as an electrolyte was used, in the electrolytic polymerization step of forming the second solid electrolytic layer 3b of Example 1. A solid electrolytic capacitor was produced in the same manner as that of Example 1, except for using the above-obtained electrolytic capacitor element.

Comparative Example

A capacitor element 10 was produced in the same manner as that of Example 1, except that an electrolytic polymerization solution containing 0.2 mol/L of pyrrole as a polymerizable monomer and 0.06 mol/L of an alkyl aromatic sulfonic acid salt as a dopant agent as well as an electrolyte was used and a second solid electrolytic layer 3b of polypyrrole was formed by bringing a metal wire for electric communication into contact with the first solid electrolytic layer 3a from the outside and applying continuous constant current adjusted to be 2 mA current density per one capacitor element for 2 hours to the electrolytic polymerization solution, in the electrolytic polymerization step of forming the second solid electrolytic layer 3b of Example 1. A solid electrolytic capacitor was produced in the same manner as that of Example 1, except for using the above-obtained electrolytic capacitor element.

Measurement Condition

In each of Examples and Comparative Example, 50 solid electrolytic capacitors with a rated voltage of 25 V and a capacitance 100 μF were prepared. The respective solid electrolytic capacitors were subjected to the measurements of ESR (measurement frequency: 100 kHz). Further, the respective electrolytic capacitors were subjected to the measurements of Capacitance (measurement frequency: 120 Hz) in the environment at room temperature of 20° C. These results are shown in following tables.

TABLE 1

| | Current condition at electrolytic polymerization | Electrolyte in electrolytic polymerization solution | Capacitance (μF) | ESR (mΩ) |
|---|---|---|---|---|
| Example 1 | intermittent constant current | EMI-BF$_4$ | 128 | 36.4 |
| Example 2 | intermittent constant current | MAI-BF$_4$ | 127 | 48.9 |
| Example 3 | intermittent constant current | MPPI-BF$_4$ | 129 | 35.2 |
| Example 5 | intermittent constant current | alkyl aromatic sulfonic acid | 100 | 79.4 |

From Table 1, in the case where the electrolytic polymerization solutions containing an ionic liquid such as (Example 1), MAI-BF4 (Example 2) or MPPI-BF4 (Example 3) as an electrolyte were used, it is found that a more increased capacitance and a more decreased ESR can be obtained, as compared with a case where the electrolytic polymerization solutions containing alkyl aromatic sulfonic acid (Example 5) as an electrolyte was used.

TABLE 2

| | Current condition at electrolytic polymerization | Electrolyte in electrolytic polymerization solution | Capacitance (μF) | ESR (mΩ) |
|---|---|---|---|---|
| Example 4 | continuous constant current | EMI-BF$_4$ | 111 | 72.3 |
| Comparative Example | continuous constant current | alkyl aromatic sulfonic acid | 105 | 88 |

From Table 2, in the case where electrolytic polymerization using continuous rated current but not intermittent rated current was carried out, it is found that a solid electrolytic capacitor produced by using the electrolytic polymerization solution containing EMI-BF4 (Example 4) of an ionic liquid as the electrolyte shows a more increased capacitance and furthermore a decreased ESR as compared with a solid electrolytic capacitor produced by using the electrolytic polymerization solution containing alkyl aromatic sulfonic acid (Comparative Example).

TABLE 3

| | Current condition at electrolytic polymerization | Electrolyte in electrolytic polymerization solution | Capacitance (μF) | ESR (mΩ) |
|---|---|---|---|---|
| Example 1 | intermittent constant current | EMI-BF$_4$ | 128 | 36.4 |
| Example 2 | intermittent constant current | MAI-BF$_4$ | 127 | 48.9 |
| Example 3 | intermittent constant current | MPPI-BF$_4$ | 129 | 35.2 |
| Example 4 | continuous constant current | EMI-BF$_4$ | 111 | 72.3 |

From Table 3, it is found that the capacitance was increased more and ESR was decreased more in the case of electrolytic polymerization using intermittent rated current (Examples 1-3) than in the case of electrolytic polymerization using continuous rated current (Example 4).

TABLE 4

| | Current condition at electrolytic polymerization | Electrolyte in electrolytic polymerization solution | Capacitance (μF) | ESR (mΩ) |
|---|---|---|---|---|
| Example 5 | intermittent constant current | alkyl aromatic sulfonic acid | 100 | 79.4 |
| Comparative Example | continuous constant current | alkyl aromatic sulfonic acid | 105 | 88 |

From Table 4, it is found that ESR was decreased more in the case of electrolytic polymerization using intermittent rated current (Example 5) than in the case of electrolytic polymerization using continuous rated current (Comparative Example).

The reasons for the results described above are supposed to be as follows.

In Comparative Example, in the case where electrolytic polymerization by normal continuous constant current was carried out, it was found that the thickness of the conductive polymer in the outer surface part of the porous anode body of tantalum and the thickness in the insides of the fine pores of the porous anode body were 0.30 μm and 0.21 μm, respectively, and thus they were different. Consequently, the electric charge quantities in the outer surface part and in the insides of the fine pores differ and thus, the electrolyte diffusion or electrophoresis to the insides of the fine pores of the anode body 1 cannot be smoothly carried out.

On the other hand, with respect to Examples 1-5, in the electrolytic polymerization carried out at intermittent constant current with or without the ionic liquids, it was found that the thickness of the conductive polymer in the outer surface part of the porous anode body of tantalum and the thickness in the insides of the fine pores of the porous anode body were approximately the same 0.24 μm. Accordingly, the electric charge quantities in the outer surface part and in the insides of the fine pores are approximately constant.

It may be attributed to that in the part of the conductive polymer cathode layer by chemical polymerization in the anode body where the metal wire for electric communication is brought into contact, the conductive polymer cathode layer by electrolytic polymerization is acceleratedly increased if the constant current is continuously applied to result in uneven distribution of the thickness of the conductive polymer.

On the other hand, in the case of using intermittent constant current, in the electrolytic polymerization solution, the electrolyte flow is stopped and electrolytic is diffused when no current flows, and the electrolyte flows when electric current is applied to repeatedly form the conductive polymer coating. Therefore, in the part of the conductive polymer cathode layer by chemical polymerization in the anode body where the metal wire for electric communication is brought into contact, the thickness is not acceleratedly increased.

Further, it may be also attributed to that since the conductivity of the electrolytic polymerization solution is improved owing to the ionic liquid, the conductive polymer cathode layer is easily formed even in a part where the metal wire for electric communication is not brought into contact with the anode body.

Further, in the case of using the electrolytic polymerization solution containing the ionic liquid and the monomer (Examples 1-4), as compared with in the case of using the common electrolytic polymerization solution containing the monomer, the solvent and the dopant agent as well as electrolyte (Comparative Example), the production of polypyrrole nuclei differs because of difference of the electric double layer structure in the interface of the porous anode body.

That is, in the electrolytic polymerization solution of Comparative Example, the surface of the anode body is covered by adsorptions of the solvent molecule, apart of monomers and anion molecules. Therefore, because of the existence of the solvent molecules, the monomer cannot evenly cover the entire surface of the anode body.

On the other hand, in the electrolytic polymerization solutions containing the ionic liquids in Examples 1-4, no solvent molecule exists on the surface of the anode body and only the monomers and the anionic molecules exist on the surface of the anode body. Consequently, the monomer can evenly cover the entire surface of the anode body. If the constant current is applied in such state, the monomer adsorbed evenly in the anode body is oxidized to form oligomers and they later form polypyrrole nuclei. As a result, an even conductive polymer cathode layer was formed.

According to the invention, there is provided a method for manufacturing a solid electrolytic capacitor having a capacitor element produced by the steps of: forming a dielectric coating layer on the surface of an anode body, forming a conductive polymer cathode layer on the dielectric coating layer, and forming a cathode lead-out layer on the conductive polymer cathode layer, wherein the step of forming the conductive polymer cathode layer comprises an electrolytic polymerization step of forming the conductive polymer cathode layer on the surface of the anode body on which the dielectric coating layer is formed by electrolytic polymerization using an electrolytic polymerization solution containing at least a monomer to be polymerized into the conductive polymer and an ionic liquid.

Preferably, the ionic liquid contains at least one selected from the group consisting of an imidazolium-based ionic liquid and a piperidinium-based ionic liquid.

According to the above-mentioned method, conductivity of the electrolytic polymerization solutions can be improved by using the ionic liquid in the electrolytic polymerization step for forming the conductive polymer cathode layer. Accordingly, it becomes easy to evenly form the conductive polymer cathode layer by electrolytic polymerization in the entire anode body. Further, the conductive polymer cathode layer can be formed densely even the insides of the fine pores of the porous anode body.

As a result, a solid electrolytic capacitor with an increased capacitor capacitance and a decreased ESR (equivalent series resistance) can be obtained.

Preferably, the electrolytic polymerization step is carried out at intermittent constant electric current.

According to the above-mentioned method, since the intermittent constant current at that time of electrolytic polymerization in the electrolytic polymerization step is used, the conductive polymer cathode layer by electrolytic polymerization is not formed acceleratedly at the feeding point in the anode body at the time of electrolytic polymerization as compared with a case of using continuous current. Consequently, the conductive polymer cathode layer tends to be evenly formed in the entire anode body and further the conductive polymer cathode layer can be formed densely even the insides of the fine pores of the porous anode body. As a result, a solid electrolytic capacitor with an increased capacitor capacitance and a decreased ESR (equivalent series resistance) can be obtained.

The present application claims priority based on Japanese Patent Application No. 2008-93469 filed on Mar. 31, 2008, the content of which is hereby incorporated by reference in their entirely.

The above description illustrates preferred embodiments and is not intended that the invention be limited to the illustrated embodiments. The scope of the present invention is indicated by the scope of the appended clams, not by the above description of embodiments, and all modifications having the equivalent meanings to the scope of the claims and within the scope are intended to be included therein.

The invention claimed is:

1. A method for manufacturing a solid electrolytic capacitor having a capacitor element produced by the steps of:

forming a dielectric coating layer on the surface of an anode body, forming a conductive polymer cathode layer on the dielectric coating layer, and forming a cathode lead-out layer on the conductive polymer cathode layer, wherein the step of forming the conductive polymer cathode layer comprises an electrolytic polymerization step of forming the conductive polymer cathode layer on the surface of the anode body on which the dielectric coating layer is formed by electrolytic polymerization using an electrolytic polymerization solution containing at least a monomer to be polymerized into the conductive polymer and an ionic liquid;

the electrolytic polymerization step is carried out at intermittent constant current.

2. The method for manufacturing a solid electrolytic capacitor according to claim 1, wherein the ionic liquid contains at least one selected from the group consisting of an imidazolium-based ionic liquid and a piperidinium-based ionic liquid.

* * * * *